(12) United States Patent
Lansing et al.

(10) Patent No.: US 10,801,876 B1
(45) Date of Patent: Oct. 13, 2020

(54) SELF-CHECKING ULTRASONIC FLUID FLOW MEASUREMENT SYSTEM

(71) Applicant: RMG Messtechnik GmbH, Butzbach, Hessen (DE)

(72) Inventors: John Lansing, Prescott, AZ (US); Torsten Dietz, Hessen (DE)

(73) Assignee: RMG MESSTECHNIK GMBH, Butzbach, Hessen (DE)

( * ) Notice: Subject to any disclaimer, the term of this patent is extended or adjusted under 35 U.S.C. 154(b) by 0 days.

(21) Appl. No.: 16/872,711

(22) Filed: May 12, 2020

(51) Int. Cl.
*G01F 1/66* (2006.01)
*G01F 25/00* (2006.01)
*G01F 15/06* (2006.01)

(52) U.S. Cl.
CPC .......... *G01F 25/0007* (2013.01); *G01F 1/663* (2013.01); *G01F 1/667* (2013.01); *G01F 15/063* (2013.01)

(58) Field of Classification Search
None
See application file for complete search history.

(56) References Cited

U.S. PATENT DOCUMENTS

| | | | | |
|---|---|---|---|---|
| 2006/0272417 A1* | 12/2006 | Zanker | ...................... | G01F 1/66 73/592 |
| 2011/0277558 A1* | 11/2011 | Dietz | ...................... | G01F 1/667 73/861.31 |
| 2014/0109687 A1* | 4/2014 | Ramsay | .................... | G01F 1/66 73/861.27 |

* cited by examiner

*Primary Examiner* — Harshad R Patel
(74) *Attorney, Agent, or Firm* — Jeffrey Streets; Leela Madan

(57) ABSTRACT

Systems or apparatus include a plurality of ultrasonic transducer pairs arranged about a conduit to establish a plurality of measurement paths directed at an acute angle relative to a central axis of the conduit. A control system is configured to perform operations comprising obtaining ultrasonic pulse transmission and detection data from the first and second ultrasonic transducers for each of the measurement paths, determining a first fluid flow rate using the data for each of the measurement paths, determining a second fluid flow rate using a subset of the data that is used to determine the first fluid flow rate, wherein the subset of the data includes only the data for a subset of the measurement paths, and determining whether a difference between the first fluid flow rate and the second fluid flow rate is greater than a difference setpoint.

22 Claims, 5 Drawing Sheets

SELF-CHECKING ULTRASONIC FLUID FLOW MEASUREMENT SYSTEM

BACKGROUND

The present disclosure relates to systems and methods for ultrasonic fluid flow measurement.

BACKGROUND OF THE RELATED ART

Ultrasonic flow meters are a type of fluid flow meter that uses sound waves to measure that rate of fluid flow through the meter. An ultrasonic flow meter may measure the flow of various fluids, including gases and liquids, using multiple pairs of ultrasonic sound-generating transducers to send and receive high frequency sound pulses. These sound pulses are typically transmitted and received several times per second between each pair of transducers, where a pair of transducers is often referred to as a path. The high frequency sound pulses for each path are directed to travel at an angle relative to a fluid flow direction through the flow meter. The transit time for these pulses to travel between a pair of transducers is determined by electronics associated with the flow meter. Of course, the transit time of a sound pulse is expected to differ depending upon whether or not the sound pulse is directed with the fluid flow direction or direct against the fluid flow direction.

From a measured difference in the transit time for each direction for each path defined by a given pair of transducers, a relative path velocity of the fluid may be computed. Thus, the ultrasonic meter is considered an inferential velocity meter because it computes volumetric fluid flow after first deteimining the individual path velocities for each pair of transducers. An average fluid velocity may be determined using a variety of methods that may differ among ultrasonic meter manufacturers. The bulk average fluid velocity is then multiplied by the meter's internal cross-sectional area to determine a volumetric fluid flow rate.

Depending upon the pipe design upstream of an ultrasonic flow meter, the fluid flow profile entering the meter may not be uniform from top to bottom and/or from side to side. As a result of this possibility, an ultrasonic flow meter may include multiple pairs of transducers, where each pair of transducers is positioned at a specific location within the flow meter in order to more accurately determine the bulk average fluid velocity, and to ultimately reduce uncertainty in the fluid flow measurement. For example, fiscal or custody measurement applications must have a high degree of accuracy (low uncertainty), and therefore use multi-path ultrasonic meters as required by the American Gas Association, Report No. 9 ("AGA 9").

One method often used to reduce the uncertainty of an ultrasonic meter is to provide a consistent and repeatable velocity profile entering the flow meter by placing a flow conditioner in a pipe upstream of the flow meter. The purpose of the flow conditioner is to reduce, or totally eliminate, any fluid swirl and flow velocity profile distortions. Reducing or eliminating such flow profile distortions before the fluid enters the flow meter will typically reduce the overall uncertainty of the flow measurements after calibration and installation in the field where upstream piping may be different.

The multiple flow paths in an ultrasonic flow meter are positioned to provide measurement accuracy and reduce measurement uncertainty in the event that the fluid flow profile becomes distorted. However, the position of the multiple flow paths in ultrasonic flow meters varies among the different flow meter manufacturers, such that each flow meter path configuration exhibits different sensitivities to these fluid flow profile distortions. Using multiple pairs of transducers reduces measurement uncertainty, but some residual uncertainty can still exist because the flow conditioner may not be able to provide the same fluid flow profile at all times under all conditions.

The difference in flow meter sensitivities from one path configuration to another has led to the practice of using two flow meters in series, where the two flow meters have different path configurations and thus different flow profile sensitivities. The reason for using two flow meters with different path configurations is to potentially eliminate what is known as common-mode effects. That is, if one meter is more or less sensitive to fluid flow profile changes than a second meter, which employs a different path design, then the a change in the fluid flow profile will result in the two flow meters outputting different volumetric flow rates. However, if the fluid flow profile remains constant or uniform, then the volumetric fluid flow rate that is output from the two flow meters should be the same.

BRIEF SUMMARY

Some embodiments provide a system or apparatus comprising a plurality of ultrasonic transducer pairs arranged about a conduit to establish a plurality of measurement paths through the conduit, wherein each ultrasonic transducer pair includes first and second ultrasonic transducers positioned about the conduit to establish one of the plurality of measurement paths through the conduit, wherein each measurement path is directed at an acute angle relative to a central axis of the conduit. The system further comprises a control system for communication with the first and second ultrasonic transducers of each of the plurality of ultrasonic transducer pairs. The control system is configured to perform operations comprising obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

Some embodiments provide a system or apparatus comprising a plurality of ultrasonic transducer pairs arranged about a conduit to establish a plurality of measurement paths through the conduit, wherein each ultrasonic transducer pair includes first and second ultrasonic transducers positioned about the conduit to establish one of the plurality of measurement paths through the conduit, wherein each measurement path is directed at an acute angle relative to a central axis of the conduit. The system further comprises a non-volatile storage device storing program instructions and a processor for communication with the first and second ultrasonic transducers of each of the plurality of ultrasonic transducer pairs and configured to process the program instructions, wherein the program instructions are configured to, when processed by the processor, cause the processor to perform various operations. The operations comprise obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

Some embodiments provide a computer program product comprising a non-volatile computer readable medium and non-transitory program instructions embodied therein, the program instructions being configured to be executable by a processor to cause the processor to perform various operations. The operations comprise obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

DETAILED DESCRIPTION

Figure 1:
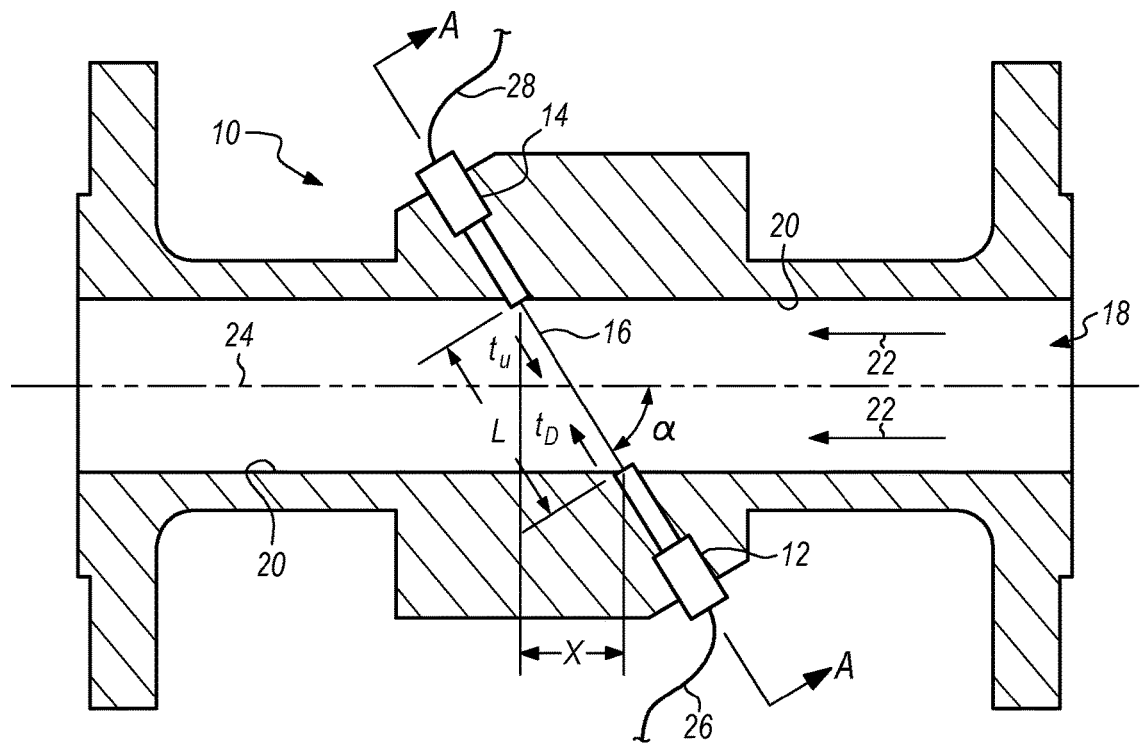
FIG. 1 is a cross-sectional diagram of a flow meter configuration with an ultrasonic transducer pair establishing a measurement path through a conduit.

Some embodiments provide a system or apparatus comprising a plurality of ultrasonic transducer pairs arranged about a conduit to establish a plurality of measurement paths through the conduit, wherein each ultrasonic transducer pair includes first and second ultrasonic transducers positioned about the conduit to establish one of the plurality of measurement paths through the conduit, wherein each measurement path is directed at an acute angle relative to a central axis of the conduit. The system further comprises a control system for communication with the first and second ultrasonic transducers of each of the plurality of ultrasonic transducer pairs. The control system is configured to perform operations comprising obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

Some embodiments of the system or apparatus may take the form of an ultrasonic flow meter including the plurality of ultrasonic transducer pairs arranged about the conduit, where the control system is a local controller that may be disposed in a housing secured to the conduit. Accordingly, the ultrasonic flow meter may be a single unit that performs all of the operations within the integral controller, or may include a separate controller or computer to calculate the second fluid flow rate.

Some embodiments of the system or apparatus may take the form of an ultrasonic flow meter in combination with a remote computer. Accordingly, the ultrasonic flow meter may include the plurality of ultrasonic transducer pairs arranged about the conduit, and the remote computer may perform all of the operations.

Some embodiments of the system or apparatus may take the form of an ultrasonic flow meter including the plurality of ultrasonic transducer pairs arranged about the conduit, where the control system includes both a local controller that may be disposed in a housing secured to the conduit and a remote computer. In such embodiments, the operations may be distributed between the local controller and the remote computer. For example, some of the operations may be performed by the local controller and some of the operations may be performed by the remote computer. The local controller and the remote computer may optionally be in communication over one or more communication network, such as a local area network or wide area network.

The plurality of ultrasonic transducer pairs are arranged about the conduit to establish the plurality of measurement paths through the conduit. Each ultrasonic transducer pair includes first and second ultrasonic transducers that are positioned about the conduit to establish one of the plurality of measurement paths through the conduit. While each measurement path is directed at an acute angle relative to a central axis of the conduit, there a numerous types of measurement paths that may be implemented about the conduit. For example, the measurement paths may each be independently selected from diametric paths, chordal paths, reflective paths, and combinations thereof. More specifically, a fluid flow measurement system may have a plurality of ultrasonic transducer pairs positioned about the conduit to establish a configuration referred to as diametric multipath, diametric multi-path reflective, multi-path parallel chordal, multi-path parallel chord reflective, multi-path mid-radius diametric, multi-path parallel crossed chord, and multi-path in-plane crossed chord. Furthermore, a fluid flow measurement system may have multiple measurement paths having any combination of paths selected from diametric, diametric reflective, chordal, chord reflective, mid-radius diametric, parallel crossed chord, and in-plane crossed chord, without limitation. Embodiments may be used to measure a flow rate of various fluids, including gases and liquids.

The plurality of ultrasonic transducer pairs may include any number of two or more ultrasonic transducer pairs. For example, an ultrasonic fluid flow measurement system may include any number of transducer pairs, such as two or more transducer pairs, including, without limitation, between 2 and 8 transducer pairs that establish an equal number of measurement paths. Regardless of the exact number of measurement paths provided in the ultrasonic fluid flow measurement system and used to determine the first fluid flow rate, a subset of one or more of those measurement paths are used to determine the second fluid flow rate. Specifically, the second fluid flow rate may be determined using at least one fewer measurement path than the number of measurement paths used to determine the first fluid flow rate. In one option, the first fluid flow rate is determined using each (all) of the measurement paths available in the ultrasonic fluid flow measurement system and the second fluid flow rate is determined using only one or more (but less than all) of those measurement paths. Accordingly, the accuracy of the first fluid flow rate may be improved by using each of the measurement paths, and the sensitivity of the second fluid flow rate to distorted fluid flow is retained by using only one or more (perhaps just one or two) of the measurement paths. Still, embodiments having X measurement paths, may determine the first fluid flow rate using up to all X measurement paths and determine the second fluid flow rate using up to X-1 of those X measurement paths, wherein X has a value of at least 2.

Some embodiments may determine the second fluid flow rate using a predetermined subset of the measurements paths established by a corresponding subset of the transducer pairs. Alternatively, some embodiments may allow for a user to select one or more of the plurality of measurement paths established by the plurality of transducer pairs to be included in the subset. However, any calibration and/or weighting factors must be available or provided to the control system in order for a selected subset of measurement paths to be used for determining the second fluid flow rate. For this reason, a predetermined subset of the measurement paths may be the most practical.

Some embodiments of the ultrasonic transducers may be piezoelectric devices capable of converting an electrical signal into an ultrasonic pulse (one or more sound pulse) and also capable of converting a received or detected ultrasonic pulse into an electrical signal. While each ultrasonic transducer may be replaced with a combination of a dedicated ultrasonic transmitter and a dedicated ultrasonic receiver, the additional number of components and requirements is generally less desirable than simply using an ultrasonic transducer. The electrical signals to and from the ultrasonic transducers are generally analog signals, wherein a signal from the control system to an ultrasonic transducer may pass through a digital to analog converter and wherein a signal from the ultrasonic transducer to the control system may pass through an analog to digital converter.

In some embodiments, the control system may implement a local controller that is in direct communication with each of the ultrasonic transducers that are included in the plurality of ultrasonic transducer pairs. Optionally, the local controller may then be in communication with a remote computer over a serial connection implementing a serial communication protocol, such as Modbus. For example, the local controller may serve as a supervisory controller and the remote computer may serve as a remote terminal unit (RTU) in compliance with a supervisory control and data acquisition (SCADA) system. Alternatively, the local controller may be in communication with a remote computer over one or more networks, such as a local area network, wide area network, cellular communication network, and the like.

In some embodiments, the operation of determining the first fluid flow rate may include further operations including determining, for each measurement path, a path velocity, and determining, for each measurement path, a first weighted path velocity as a mathematical product of the path velocity for the measurement path and a first weighting factor that is assigned to the measurement path for use in determining the first fluid flow rate. The further operations may also include determining the first fluid flow rate as a sum of the first weighted path velocities for each of the measurement paths, where the first fluid flow rate is a mean fluid flow velocity through the conduit. For embodiments in which the subset of measurement paths includes multiple measurement paths, the operation of determining the second fluid flow rate may include the further operations of determining, for each measurement path in the subset of measurement paths, a second weighted path velocity as a mathematical product of the path velocity for the measurement path and a second weighting factor that is assigned to the measurement path for use in determining the second fluid flow rate, and determining the second fluid flow rate as a sum of the second weighted path velocities for each measurement path, wherein the second fluid flow rate is a mean fluid flow velocity through the conduit. For embodiments in which the subset of measurement paths is a single measurement path, the operation of determining the second fluid flow rate may include the further operation of determining the second fluid flow rate as a mathematical product of the path velocity for the single measurement path and a second weighting factor that is assigned to the single measurement path, wherein the second fluid flow rate is a mean fluid flow velocity through the conduit.

In some embodiments, the operation of determining the first fluid flow rate may include further operations including determining, for each measurement path, a path velocity, and determining, for each measurement path, a first weighted path velocity as a mathematical product of the path velocity for the measurement path and a first weighting factor that is assigned to the measurement path for use in determining the first fluid flow rate. The further operations may also include determining a first mean fluid flow velocity through the conduit as a sum of the first weighted path velocities for each measurement path, and determining the first fluid flow rate as a mathematical product of the first mean fluid flow velocity and a cross-sectional area of the conduit. Accordingly, the first fluid flow rate is a volumetric flow rate. For embodiments in which the subset of measurement paths includes multiple measurement paths, the operation of determining the second fluid flow rate may include further operations including determining, for each measurement path in the subset of measurement paths, a second weighted path velocity as a mathematical product of the path velocity for the measurement path and a second weighting factor that is assigned to the measurement path for use in determining the second fluid flow rate. The operations may still further include determining a second mean fluid flow velocity through the conduit as a sum of the second weighted path velocities for each of the measurement paths in the subset of measurement paths, and determining the second fluid flow rate as a mathematical product of the second mean fluid flow velocity and the cross-sectional area of the conduit, wherein the second fluid flow rate is a volumetric fluid flow rate through the conduit. For embodiments in which the subset of measurement paths is a single measurement path, the operation of determining the second fluid flow rate may include further operations comprising determining a second mean fluid flow velocity as a mathematical product of the path velocity for the single measurement path and a second weighting factor that is assigned to the single measurement path for use in determining the second fluid flow rate, and determining the second fluid flow rate as a mathematical product of the second mean fluid flow velocity and the cross-sectional area of the conduit, wherein the second fluid flow rate is a volumetric fluid flow rate through the conduit.

The term "fluid flow rate" is used in a broad sense to mean any measure of a rate as which fluid flows. Some embodiments may determine and use a fluid flow rate that is expressed as a fluid velocity and some embodiments may determine and use a fluid flow rate that is expressed as a volumetric fluid flow rate. It should be recognized that a mean fluid velocity (i.e., distance per unit of time) through the conduit is proportional to the volumetric fluid flow rate (i.e., volume per unit of time) through the conduit, since the volumetric fluid flow rate is the mathematical product of the mean fluid velocity and the cross-sectional area of the conduit. Furthermore, some embodiments may determine and use a fluid flow rate that is instantaneous or accumulated/averaged over some period of time. Non-limiting examples of the later would include a total accumulated volume of fluid over a period of time or an average fluid flow velocity over a period of time. In any of these embodiments, a value for the difference setpoint may be expressed in the same units as the first and second fluid flow rates (i.e., meters/second or liters/second), but is preferably expressed as a percentage. In one example, the difference between the first fluid flow rate and the second fluid flow rate is expressed as a percentage difference, and the difference setpoint is expressed as a percentage difference setpoint. The value of the difference setpoint may be selected and input by a user or determined during setup or calibration. It should be recognized that the difference between the first fluid flow rate and the second fluid flow rate may be either a positive or negative difference. Accordingly, some embodiments may determine the absolute value of the difference between the first fluid flow rate and the second fluid flow rate before determining whether that difference is greater than a difference setpoint. Alternatively, embodiments may determine whether the second fluid flow rate is within a range of deviation that is plus or minus (+/−) the difference setpoint from the first fluid flow rate.

Some embodiments will automatically take action responsive to the difference between the first and second fluid flow rates. In one example, the operations may further include triggering an alarm in response to determining that the difference between the first fluid flow rate and the second fluid flow rate is greater than a difference setpoint. Optionally, the triggering of the alarm may cause some visual or audible alert, or may cause an electronic message to be sent to a designated user device, such as a mobile smartphone, tablet, or computer, or a combination thereof. In another example, the operations may further include storing the first fluid flow rate in a data storage device, and flagging the first fluid flow rate as having reduced reliability (increased uncertainty) in response to determining that the difference between the first fluid flow rate and the second fluid flow rate is greater than a difference setpoint.

Some embodiments of the ultrasonic pulse transmission and detection data for each measurement path may include a first transit time for an ultrasonic pulse transmitted along the measurement path with a direction of fluid flow through the conduit and a second transit time for an ultrasonic pulse transmitted along the measurement path against the direction of fluid flow through the conduit. In other embodiments, the ultrasonic pulse transmission and detection data for each measurement path may include an ultrasonic pulse frequency shift.

Some embodiments disclosed herein may provide a system or apparatus comprising a plurality of ultrasonic transducer pairs arranged about a conduit to establish a plurality of measurement paths through the conduit, wherein each ultrasonic transducer pair includes first and second ultrasonic transducers positioned about the conduit to establish one or more of the plurality of measurement paths through the conduit, wherein each measurement path is directed at an acute angle relative to a central axis of the conduit. The system further comprises a non-volatile storage device storing program instructions and a processor for communication with the first and second ultrasonic transducers of each of the plurality of ultrasonic transducer pairs and configured to process the program instructions, wherein the program instructions are configured to, when processed by the processor, cause the processor to perform various operations. The operations may comprise obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

Some embodiments may provide a computer program product comprising a non-volatile computer readable medium and non-transitory program instructions embodied therein, the program instructions being configured to be executable by a processor to cause the processor to perform various operations. The operations may comprise obtaining ultrasonic pulse transmission and detection data from the first and second ultrasonic transducers for each of the measurement paths, determining a first fluid flow rate using the ultrasonic pulse transmission and detection data for each of the measurement paths, determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths, and determining whether a difference between the first fluid flow rate and the second fluid flow rate is greater than a difference setpoint.

The foregoing computer program products may further include program instructions for implementing or initiating any one or more aspects of the operations described herein. Accordingly, a separate description of the operations will not be duplicated in the context of a computer program product. It is a beneficial feature of various embodiments that the controller of an existing multi-path ultrasonic flow meter and/or a remote computer may be upgraded so that the system includes the computer program product and may thereby achieve the benefits of a self-checking second fluid flow rate determination. Such an upgrade may be accomplished by installing the computer program product alone, or by installing a new controller that is able to perform the operations of the computer program product.

Example 1 (Hypothetical Uniform Flow Conditions)

A six-path ultrasonic flow measurement system including a conduit having a nominal diameter of 8 inches (actual bore diameter of 193.7 mm) and six ultrasonic transducer pair used to measure a fluid flow rate through the conduit. Each transducer pair defined has a fixed path length (L) and a fixed path axial distance (X) as illustrated in FIG. 1. For each transducer pair, a first ultrasonic pulse was transmitted or generated by a first transducer and received or detected by a second transducer that is downstream of the first transducer in order to measure a downstream transit time ($t_D$) for the first ultrasonic pulse. The first ultrasonic pulse was transmitted downstream (i.e., "with" the fluid flow) such that the pulse had a vector component in common with a direction of fluid flow through the conduit. Similarly for each transducer pair, a second ultrasonic pulse was transmitted or generated by the second transducer and received or detected by the first transducer that is upstream of the second transducer in order to measure an upstream transit time ($t_U$) for the second ultrasonic pulse. The second ultrasonic pulse was transmitted upstream (i.e., "against" the fluid flow) such that the pulse had a vector component that is opposite of a direction of fluid flow through the conduit.

The six-path ultrasonic flow measurement system included a controller that obtained data from the six ultrasonic transducer pairs (i.e., 12 total transducers). For each ultrasonic transducer pair, the data provided measurement of the transit times of ultrasonic pulses transmitted in both an upstream direction and downstream direction through the fluid flowing in the conduit. The downstream transit time ($t_D$) and upstream transit time ($t_U$) for each of the six ultrasonic transducer pairs (i.e., a total of twelve transit time measurements) are provided in Table 1, below, as well as the path length (L) and path axial distance (X) established by the physical position of the transducers that form each of the six ultrasonic transducer pairs. The controller then calculated the path velocity of the fluid flowing through the measurement path of each transducer pair using Equation 1A, below.

$$\overline{v} = \frac{L^2}{2X} \frac{(t_U - t_D)}{t_U t_D}$$ Equation 1A where: v is the path velocity for a measurement path established by an ultrasonic transducer pair;

L is the linear distance (length) of the measurement path between the two ultrasonic transducers of the pair;

X is the distance that the measurement path extends axially along the conduit;

$t_U$ is the transit time of an ultrasonic pulse directed upstream (against the fluid flow) along the measurement path; and $t_D$ is the transit time of an ultrasonic pulse directed downstream (with the fluid flow) along the measurement path.

The path velocity for a measurement path may be also be determined by an alternative Equation 1B, below. However, Equations 1A and 1B yield the same path velocity values.

$$v_{Pfad} = \frac{L}{2 \cdot \cos\alpha} \left( \frac{1}{t_{AB}} - \frac{1}{t_{BA}} \right)$$ Equation 1B

TABLE 1

Path Velocity Calculations

| Ultrasonic Transducer Pair | Downstream Transit Time ($t_D$) (microseconds) | Upstream Transit Time ($t_U$) (microseconds) | Path Length (L) (millimeters) | Path Axial Distance (X) (millimeters) | Path Velocity (v) (m/s) |
|---|---|---|---|---|---|
| 1 | 461.628 | 467.877 | 194.020 | 95.905 | 5.678 |
| 2 | 461.711 | 468.020 | 194.040 | 95.905 | 5.731 |
| 3 | 596.961 | 606.696 | 251.310 | 135.630 | 6.258 |
| 4 | 597.110 | 606.840 | 251.280 | 135.630 | 6.250 |
| 5 | 461.521 | 467.889 | 193.970 | 95.905 | 5.785 |
| 6 | 461.551 | 467.787 | 193.930 | 95.905 | 5.665 |

Having determined the path velocity for each measurement path defined by an ultrasonic transducer pair, the controller applies a weighting factor to each path velocity to determine a mean fluid flow velocity for the fluid flowing through the conduit. The fluid flow measurement system may be preprogrammed or otherwise set with a specific weighting value for each measurement path. For example, if there are n measurement paths, then there may be n weighting factors with each weighting factor assigned to one of the measurement paths. However, it is possible for more than one measurement path to be assigned a weighting factor having the same value. The weighting factors are specifically assigned for use with a particular flow rate calculation. In the example of a six-path ultrasonic flow measurement system, there is one weighting factor for each of the six measurements paths established by one of the ultrasonic transducer pairs. The controller then calculated the mean fluid flow velocity through the conduit using Equation 2, below.

$$V = (v_1 \times w_1) + (v_2 \times w_2) + \ldots + (v_n \times w_n)$$ Equation 2:

where: V is the mean fluid flow velocity through the conduit;

$v_n$ is the path velocity for an nth measurement path; and $w_n$ is a weighting factor assigned to the measurement path.

TABLE 2

Mean Fluid Flow Velocity Calculation for First (Main) Fluid Flow Rate

| Ultrasonic Transducer Pair | Path Velocity (v) (meters/second) | First (Main) Flow Rate Weighting (w) | v x w |
|---|---|---|---|
| 1 | 5.678 | 0.125 | 0.709771331 |
| 2 | 5.731 | 0.125 | 0.71638617 |
| 3 | 6.258 | 0.250 | 1.564561563 |
| 4 | 6.250 | 0.250 | 1.52623654 |
| 5 | 5.785 | 0.125 | 0.723063854 |
| 6 | 5.665 | 0.125 | 0.708111064 |
| Mean Fluid Flow Velocity (meters/second) | | | 5.985 |

It may be noted that each flow meter may also be calibrated in a calibration lab before being used in the field. Such a calibration may result in a determination of a correction factor that is applied to the first output (i.e., the determined first fluid flow rate) and a correction factor that is applied to the second output (i.e., the determined second fluid flow rate) so that the outputs agree with known flow rates. Accordingly, the first and second fluid flow rates should agree throughout the entire flow rate range under uniform fluid flow conditions. However, the use of correction factors is not included in this example.

The six-path ultrasonic flow measurement system obtained transit time data from each ultrasonic transducer pair and calculated a path velocity for each measurement path defined by an ultrasonic transducer pair. A subset of this transit time data was used in a calculation for a second fluid flow rate representing a virtual check meter or a self-checking meter. In this example, the subset of the transit time data included only the transit time data for the third ultrasonic transducer pair (i.e., Ultrasonic Transducer Pair #3). In fact, since the controller had already calculated the path velocity for the third ultrasonic transducer pair, the controller used the path velocity for the third measurement path to calculate the second fluid flow rate. This second fluid flow rate is analogous to the output of a single path ultrasonic flow measurement system, such that the second fluid flow rate may be used as a self-checking meter while avoiding the capital and maintenance expenses associated with installation and operation of a separate ultrasonic flow measurement system to serve as a check meter.

Having already determined the path velocity for the third measurement established by the third ultrasonic transducer pair, the controller applies a weighting factor to the third path velocity to determine a mean fluid flow velocity for the fluid flowing through the conduit. It is important to note that the weighting factor used for this single-path fluid flow rate calculation is specific to the single-path fluid flow rate calculation. The weighting factor applied to the third measurement path in the single-path fluid flow rate calculation is different from the weighting factor that is applied to the third measurement path in the six-path fluid flow rate calculation. The controller then calculates the mean fluid flow velocity through the conduit using Equation 2, above.

TABLE 2

Mean Fluid Flow Velocity Calculation for Second (Check) Fluid Flow Rate

| Ultrasonic Transducer Pair | Path Velocity (v) (meters/second) | Second (Check) Flow Rate Weighting (w) | v x w |
|---|---|---|---|
| 1 | 5.678 | 0 | 0 |
| 2 | 5.731 | 0 | 0 |
| 3 | 6.258 | 0.95 | 5.945 |
| 4 | 6.250 | 0 | 0 |
| 5 | 5.785 | 0 | 0 |
| 6 | 5.665 | 0 | 0 |
| Mean Fluid Flow Velocity (meters/second) | | | 5.945 |

It may be noted at this point, that the controller could calculate a different self-check fluid flow rate and/or multiple self-check fluid flow rates so long as the controller had calibrated weighting factors for such various other self-checking fluid flow rate calculations. In one option, a self-check fluid flow rate could be calculated using a different measurement path, which would be analogous to the output of a different single-path check meter. In another option, a self-check fluid flow rate could be calculated using multiple measurement paths, which would be analogous to the output of a multi-path check meter. In each of these options, the self-check fluid flow rate is determined using a subset of the data that is used to calculation a first (main) fluid flow rate.

In some embodiments, the controller may take the additional step of calculating a volumetric flow rate through the conduit using the mean fluid flow velocity through the conduit and the interior cross-sectional area of the conduit (i.e., the area of the bore through the conduit). The controller may perform this calculation using Equation 3, below.

$$Q = V \times A \qquad \text{Equation 3:}$$

where: Q is a volumetric flow rate through the conduit;
V is a mean fluid flow velocity through the conduit; and
A is the interior cross-sectional area of the conduit.

Next, the controller determines whether the first fluid flow rate (determined using the transit time data for each of the measurement paths) and the second fluid flow rate (determined using a subset of the transit time data or calculated path velocities for a subset of the measurement paths) have a difference greater than a difference setpoint. A value for the difference setpoint may be selected and input by a user or determined during calibration. The value of the difference setpoint be expressed in the same units as the first and second fluid flow rates (i.e., meters/second), but is preferable expressed as a percentage. Accordingly, the percentage difference between the first and second fluid flow rates is calculated according to Equation 4, below.

$$\text{Percentage Difference} = \frac{(\text{second fluid flow rate} - \text{first fluid flow rate})}{(\text{first fluid flow rate})} \times 100\% \qquad \text{Equation 4}$$

If the controller determines that the difference between the first and second fluid flow rates is less than the difference setpoint, this means that the single-path self-check confirms the reliability of the first fluid flow rate determined by the six-path ultrasonic fluid flow measurement system. This agreement typically occurs when the fluid flowing through the conduit has a uniform fluid flow profile. However, if the controller determines that the difference between the first and second fluid flow rates is greater than the difference setpoint, this means that the single-path self-check does not confirm the reliability of the first fluid flow rate determined by the six-path ultrasonic fluid flow measurement system. This disagreement typically occurs when the fluid flowing through the conduit has a distorted fluid flow profile.

In Example 1, a difference setpoint of 0.7% is used. The controller calculates that the percentage difference between the first and second fluid flow rates is ((5.945−5.985)/5.945)×100%=0.655%. Since the percentage difference (0.655%) is less than the difference setpoint (0.7%), the controller determines that the second fluid flow rate confirms the reliability of the first fluid flow rate.

Example 2 (Hypothetical Distorted Flow Conditions)

The same six-path ultrasonic flow measurement system used in Example 1, above, was used in the same manner as described in Example 1. However, the fluid flow conditions were different and the controller was able to detect that the fluid flow conditions were distorted and the first fluid flow rate measured by the six-path ultrasonic flow measurement system has questionable reliability.

As in Example 1, the same Equations 1 and 2 were used to calculate a first fluid flow rate for the six-path ultrasonic flow measurement system (using data for each of the six measurement paths) and the single-path self-check (using only the data for the third measurement path). Note that the path length (L), the path axial distance (X) and the weighting factors are the same in Example 2 as in Example 1. The differences in the Tables from Example 1 to Example 2 are merely a result of the different flow conditions of the fluid flowing through the conduit, which altered the downstream and upstream transit time measurements. The controller's calculation of the first and second fluid flow rates under these conditions are represented in the following Tables 4, 5 and 6.

TABLE 4

Path Velocity Calculations

| Ultrasonic Transducer Pair | Downstream Transit Time ($t_D$) (microseconds) | Upstream Transit Time ($t_U$) (microseconds) | Path Length (L) (millimeters) | Path Axial Distance (X) (millimeters) | Path Velocity (v) (m/s) |
|---|---|---|---|---|---|
| 1 | 458.875 | 470.146 | 194.020 | 95.905 | 10.253 |
| 2 | 459.003 | 470.407 | 194.040 | 95.905 | 10.368 |
| 3 | 592.736 | 610.354 | 251.310 | 135.630 | 11.338 |
| 4 | 592.892 | 610.616 | 251.280 | 135.630 | 11.396 |
| 5 | 458.765 | 470.156 | 193.970 | 95.905 | 10.359 |
| 6 | 458.763 | 470.162 | 193.930 | 95.905 | 10.365 |

TABLE 5

Mean Fluid Flow Velocity Calculation for First (Main) Fluid Flow Rate

| Ultrasonic Transducer Pair | Path Velocity (v) (meters/second) | First (Main) Flow Rate Weighting (w) | v x w |
|---|---|---|---|
| 1 | 10.253 | 0.125 | 1.281643015 |
| 2 | 10.368 | 0.125 | 1.295952872 |
| 3 | 11.338 | 0.250 | 2.834570722 |
| 4 | 11.396 | 0.250 | 2.848971266 |
| 5 | 10.359 | 0.125 | 1.294903757 |
| 6 | 10.365 | 0.125 | 1.295668687 |
| Mean Fluid Flow Velocity (meters/second) | | | 10.852 |

TABLE 6

Mean Fluid Flow Velocity Calculation for Second (Check) Fluid Flow Rate

| Ultrasonic Transducer Pair | Path Velocity (v) (meters/second) | Second (Check) Flow Rate Weighting (w) | v x w |
|---|---|---|---|
| 1 | 10.253 | 0 | 0 |
| 2 | 10.368 | 0 | 0 |
| 3 | 11.338 | 0.95 | 10.771 |
| 4 | 11.396 | 0 | 0 |
| 5 | 10.359 | 0 | 0 |
| 6 | 10.365 | 0 | 0 |
| Mean Fluid Flow Velocity (meters/second) | | | 10.771 |

The controller then determines whether the first fluid flow rate (determined using the transit time data for each of the measurement paths) and the second fluid flow rate (determined using a subset of the transit time data or calculated path velocities for a subset of the measurement paths) have a difference greater than the difference setpoint used in Example 1. Accordingly, the controller calculates that the percentage difference between the first and second fluid flow rates is ((10.771−10.852)/10.852)×100%=0.740%. Since the percentage difference (0.740%) is greater than the difference setpoint (0.7%), the controller concludes that the second fluid flow rate indicates some unreliability of the first fluid flow rate. This conclusion may be the result of a distorted fluid flow profile within the conduit.

FIG. 1 is a cross-sectional diagram of the body of a flow meter 10 illustrating a single ultrasonic transducer pair including a first ultrasonic transducer 12 and a second ultrasonic transducer 14 establishing a measurement path 16 through a conduit 18. The conduit 18 has an interior bore defined by walls 20, where the bore has a diameter D. For any particular installation, the conduit 18 will have a fluid flow direction (see arrow 22).

The first and second ultrasonic transducers 12, 14 of the ultrasonic transducer pair are secured in positions about the conduit 18 in order to transmit and receive ultrasound pulses along the measurement path 16 at an acute angle (a) relative to the axial center of the conduit 18. The length of the measure path 16 (i.e., the distance that the ultrasound pulse must travel between the first and second ultrasonic transducers 12, 14) is shown as a distance or length L. The axial distance (i.e., the distance upstream/downstream along the central axis 24) between the first and second ultrasonic transducers 12, 14 is shown as a distance X. At a given point in time, a first ultrasonic pulse may be transmitted or generated by the first transducer 12 and received or detected by the second transducer 14 that is downstream (see fluid flow directional arrow 22) of the first transducer 12 in order to measure a downstream transit time ($t_D$) for the first ultrasonic pulse. The first ultrasonic pulse is transmitted downstream (i.e., "with" the fluid flow) such that the pulse has a vector component in common with the direction of fluid flow 22 through the conduit 18. Similarly at another point in time, a second ultrasonic pulse may be transmitted or generated by the second transducer 14 and received or detected by the first transducer 12 that is upstream of the second transducer 14 in order to measure an upstream transit time ($t_U$) for the second ultrasonic pulse. The second ultrasonic pulse is transmitted upstream (i.e., "against" the fluid flow) such that the pulse has a vector component that is opposite of the direction of fluid flow through the conduit 18. The terms "first" and "second" are used only to distinguish between the two pulses and do not indicate any particular order in which the pulses should be transmitted and received.

A control system (not shown) may communicate with the first and second ultrasonic transducers 12, 14 via first and second electrically conductive cables 26, 28, respectively. For example, the control system may cause the first ultrasonic transducer 12 to transmit a downstream pulse into the fluid by sending a signal over the first cable 26 and may receive a detection signal from the second ultrasonic transducer 14 over the second cable 28 in response to the second ultrasonic transducer 14 detecting or receiving the downstream pulse in the fluid. The difference between the time at which the first ultrasonic transducer 12 transmits the downstream pulse and the time at which the second ultrasonic transducer 14 receives the downstream pulse is the downstream transit time ($t_D$) for this ultrasonic transducer pair. Similarly, the control system may cause the second ultrasonic transducer 14 to transmit an upstream pulse into the fluid by sending a signal over the second cable 28 and may receive a detection signal from the first ultrasonic transducer 12 over the first cable 26 in response to the first ultrasonic transducer 12 detecting or receiving the upstream pulse in the fluid. The difference between the time at which the second ultrasonic transducer 14 transmits the upstream pulse and the time at which the first ultrasonic transducer 12 receives the upstream pulse is the upstream transit time ($t_U$) for this ultrasonic transducer pair.

Embodiments of an ultrasonic fluid flow measurement system will have a plurality of ultrasonic transducer pairs, where each ultrasonic transducer pair has first and second ultrasonic transducers similar to the first and second ultrasonic transducers 12, 14. The only differences between the first and second ultrasonic transducers 12, 14 and any other pair of ultrasonic transducer in the ultrasonic fluid flow measurement system is the positioning of the first and second ultrasonic transducers and the resulting path dimensions and type. In other words, it is not necessary for each ultrasonic transducer pair to establish a measurement path having the same length L, the same axial distance X, the same angle α, or the same diametric, chordal or reflective configuration.

Figure 2:
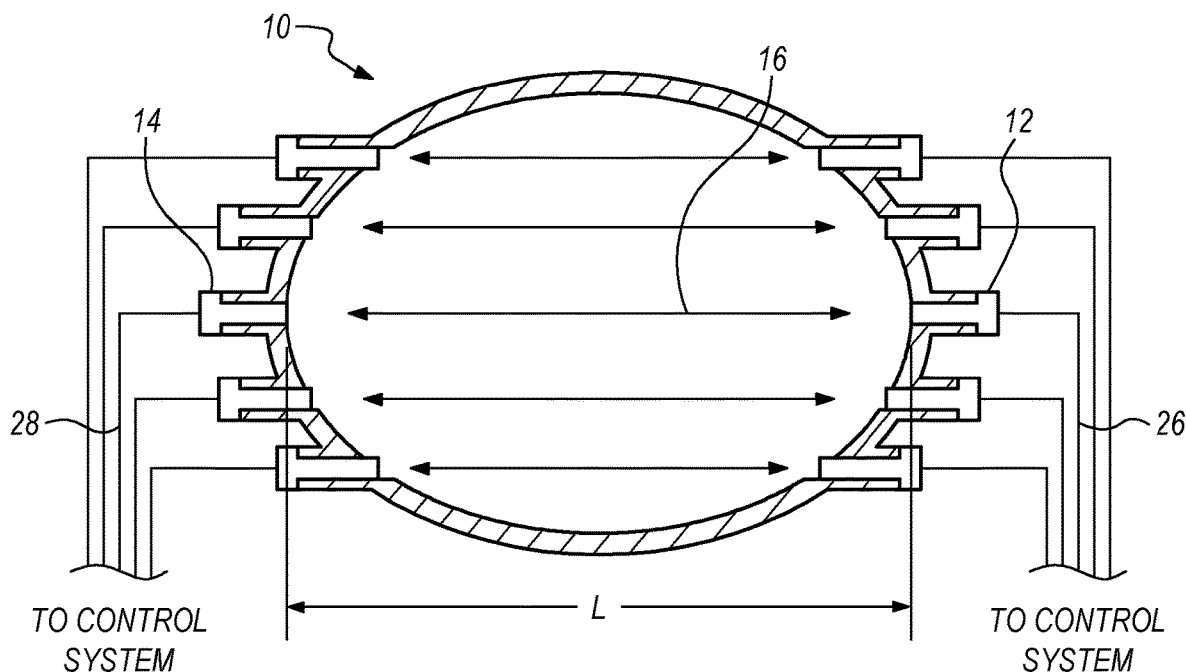
FIG. 2 is a cross-sectional diagram of the flow meter of FIG. 1 taken along line A-A in accordance with a non-limiting embodiment where the flow meter has a multi-path parallel chordal configuration.

FIG. 2 is a cross-sectional diagram of the body of the flow meter 10 taken along line A-A of FIG. 1 if the flow meter 10 had a six-path parallel chordal configuration. The cross-section may be considered to be an oblique cross-section since it is taken along a line that is neither perpendicular nor parallel to the axial centerline 24. In the six-path parallel chordal configuration, it should be understood that the path length L and the axial distance X will vary among the six measurement paths. Each of the twelve transducers has an electrically conductive cable for sending and receiving communication signals to and from a control system (not shown). For example, the cable 26 is connected to the first ultrasonic transducer 12 and the cable 28 is connected to the second ultrasonic transducer 14.

Figure 3:
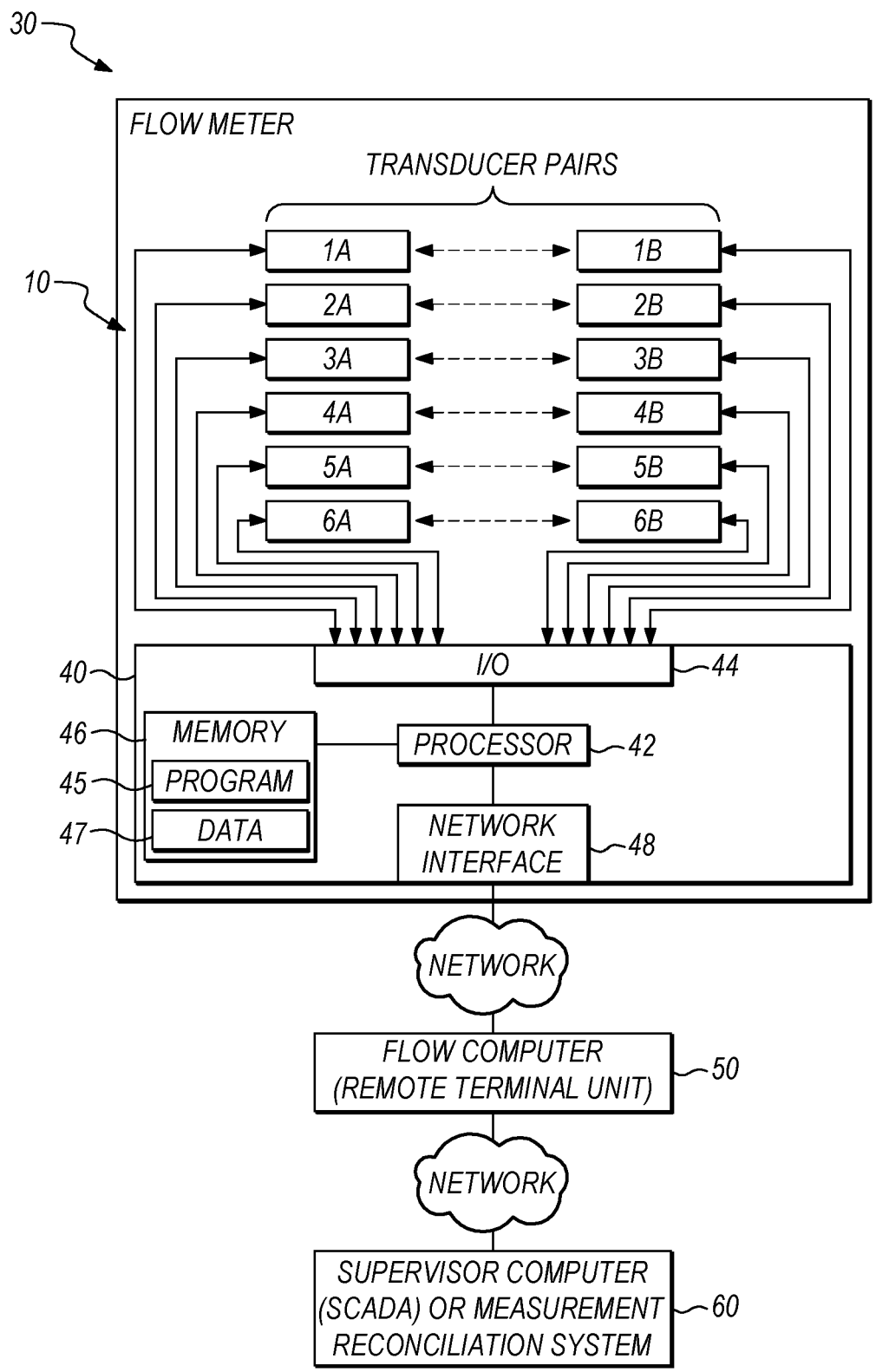
FIG. 3 is a block diagram of a system for measuring a fluid flow rate with self-check.

FIG. 3 is a block diagram of an ultrasonic fluid flow measurement system 30 for measuring a first (main) fluid flow rate and a second (self-check) fluid flow rate. The ultrasonic fluid flow measurement system 30 includes the flow meter 10 and a local controller 40. The local controller 40 is preferably secured to the flow meter 10, such as the flow meter shown in FIG. 1. The local controller 40 includes a processor 42 in communication with an input/output module 44, memory 46, and a network interface 48. The memory 46 may store program instructions 45 and data 47 for performing various embodiments. For example, the program instructions 45 may be executable by the processor 42 to cause the processor to perform operations according to embodiments described herein. Furthermore, the data 47 may include flow meter parameters, such as length L, axial distance X, and angle α for each measurement path (each ultrasonic transducer pair), weightings used for calculating a mean fluid flow velocity, and/or a difference setpoint that may trigger an alarm.

The local controller 40 may communicate with a flow computer or remote terminal unit (RTU) 50 over a network, such as a local area network. The operations of various embodiments may be performed by the flow computer 50 alone or in combination with the local controller 40. The flow computer 50 may also be in communication with a supervisory computer 60 over a network, such as a wide area network including the Internet. Accordingly, the operations of various embodiments may be performed by the local controller 40, the flow computer 50, and/or the supervisory computer or measurement reconciliation system 60.

Figure 4:
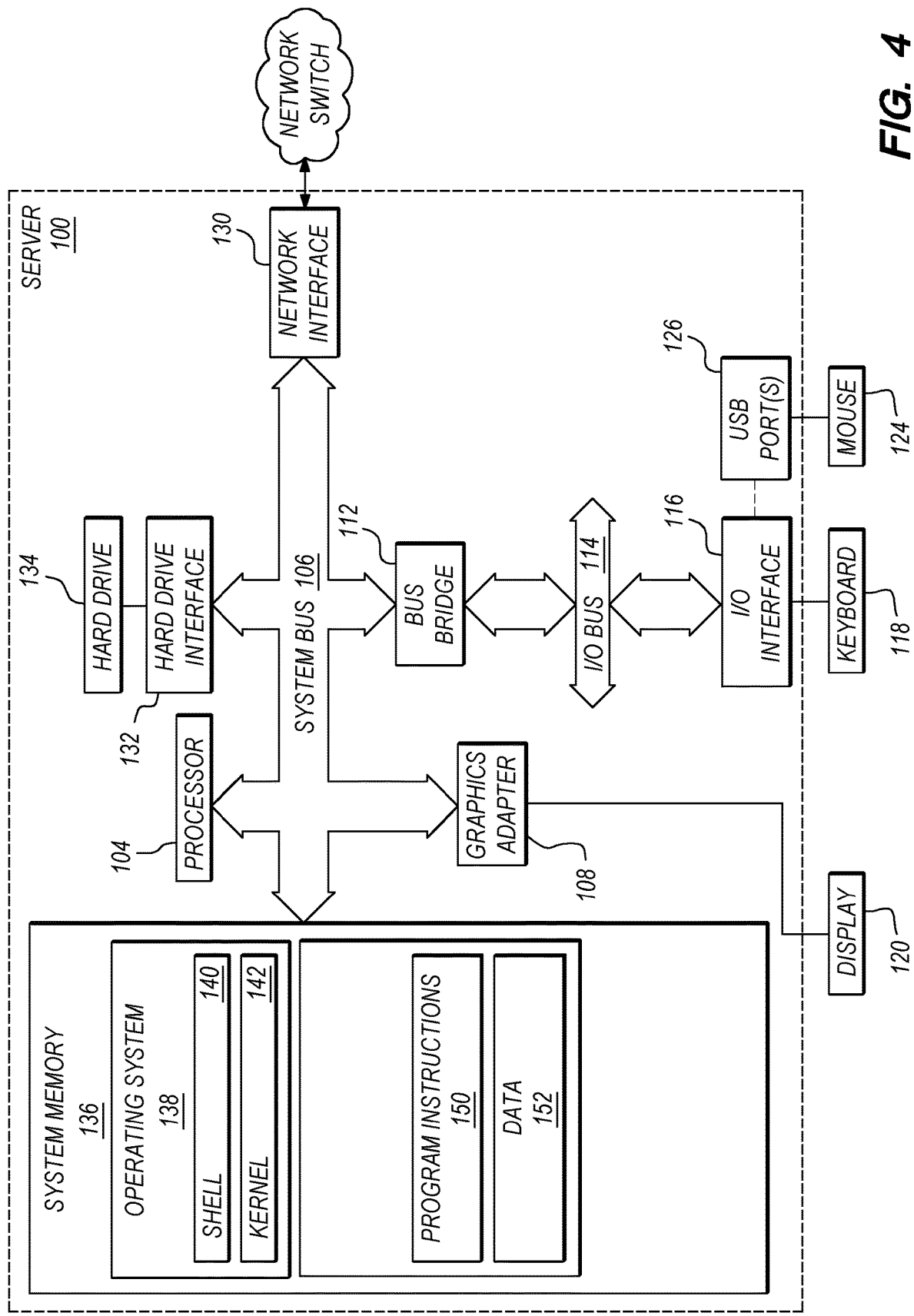
FIG. 4 is a block diagram of a computer that may represent a local controller and/or a remote computer.

FIG. 4 is a block diagram of a computer 100 that may, without limitation, be representative of the local controller 40, the flow computer 50 and/or the supervisory computer 60 of FIG. 3. However, the embodiments are not limited to the particular architecture shown. For example, the computer may include additional components or exclude some components shown.

The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 and a USB mouse 124 via USB port(s) 126. As depicted, the computer 100 is able to communicate over one or more network using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory may be the lowest level of volatile memory in the computer 100. This volatile memory may include additional higher levels of volatile memory (not shown), including, but not limited to, cache memory, registers and buffers. Data that populates the system memory 136 may include an operating system (OS) 138, program instructions 150 and data 152.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs (i.e., program instructions 150). Such essential services may include memory management, process and task management, disk management, and mouse and keyboard management.

Figure 5A:
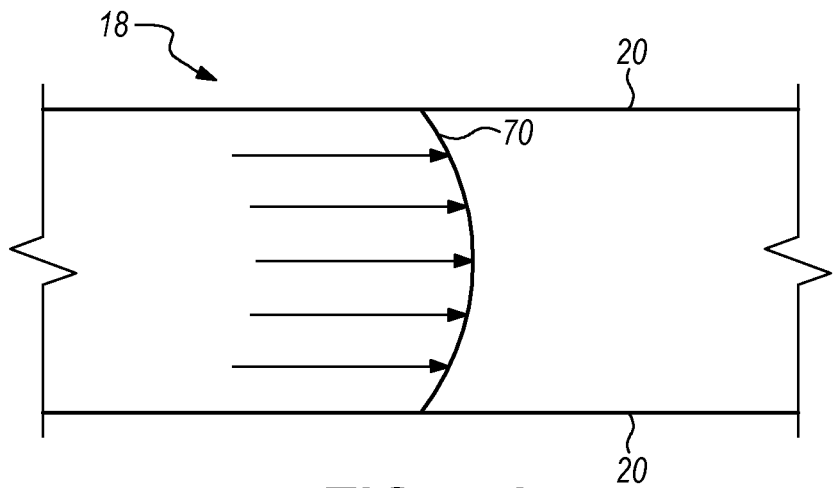
FIGS. 5A-5C are schematic diagrams of fluid flow in a conduit.
Figure 5B:
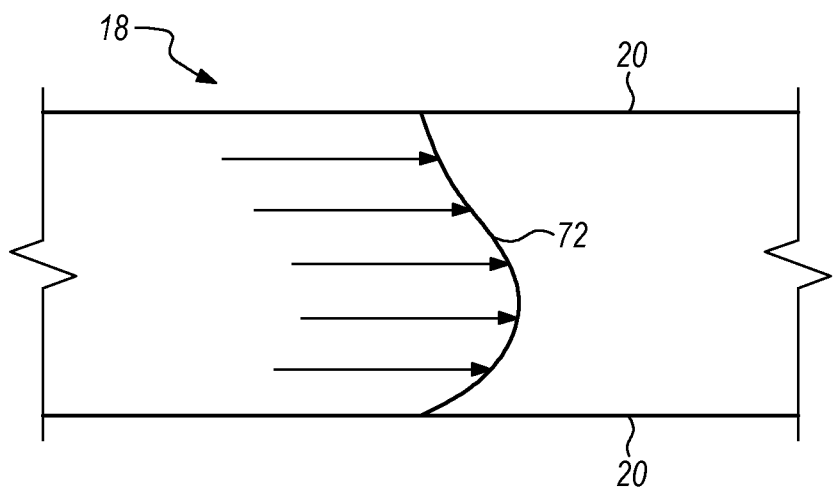
Figure 5C:
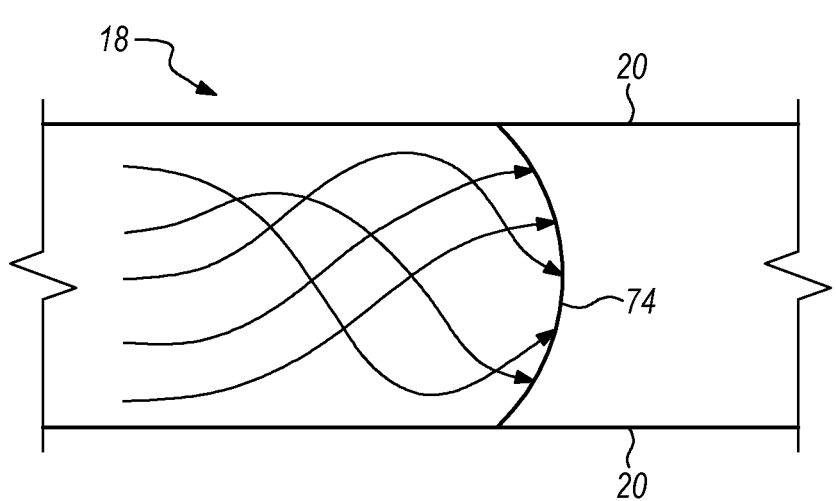

FIGS. 5A-5C are schematic diagrams of fluid flow in a conduit having walls 20. FIG. 5A illustrates a uniform flow profile 70. While fluid along the walls 20 may flow at a slower rate than fluid flowing through the center of the conduit 18 (i.e., along the axial centerline 24), the flow profile is generally symmetrical about the axial center of the conduit. FIG. 5B illustrates a distorted flow profile 72 in which fluid flowing along the bottom of the conduit 18 is flowing faster than fluid flowing along the top of the conduit. Varying types and degrees of distorted flow may exist, but a distorted flow profile 72 is not symmetrical about the axial center of the conduit. FIG. 5C illustrates swirling fluid flow 74 through the conduit. It may present a challenge for the ultrasonic fluid flow measurement system to measure the fluid flow rate of fluid that is swirling through the conduit 18, since the swirling motion changes a basic assumption that the direction of fluid flow through the conduit is parallel to the central axis. Embodiments described herein may be capable of detecting distorted fluid flow as in FIG. 5B and swirling fluid flow as in FIG. 5C.

Figure 6:
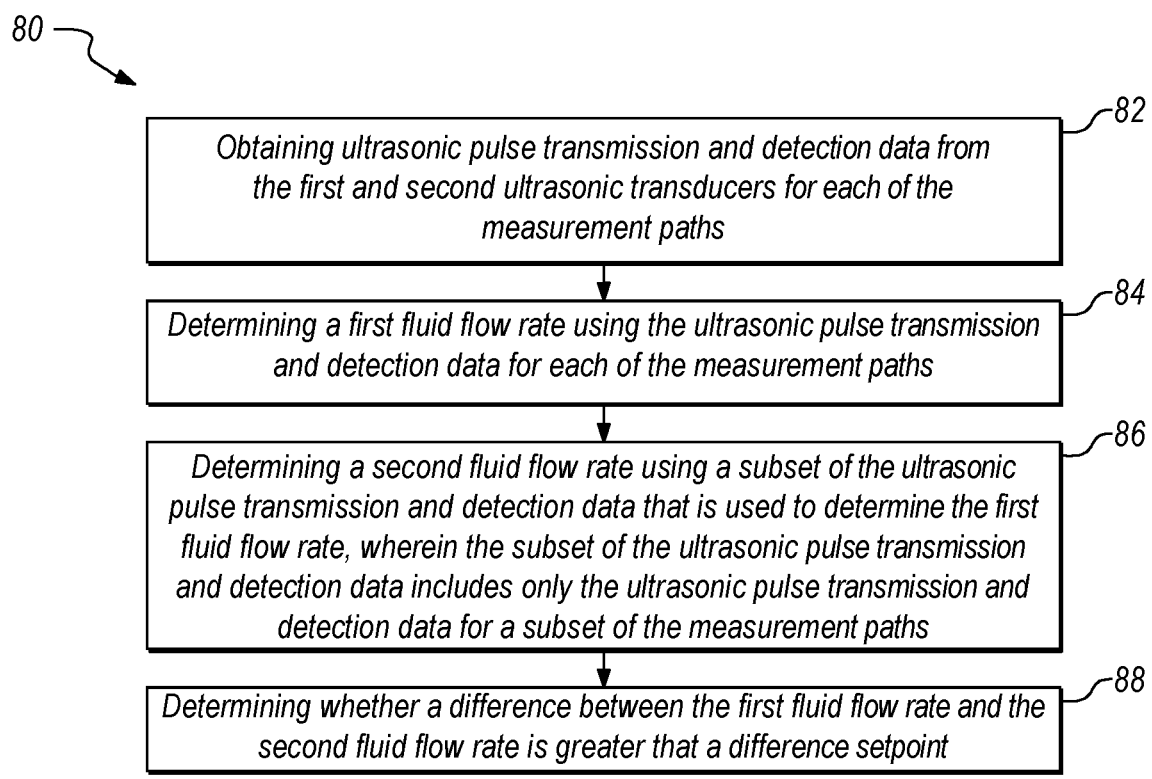
FIG. 6 is a flowchart of operations according to one embodiment.

FIG. 6 is a flowchart of operations 80 according to one embodiment. The operations may be performed by at least one processor as a result of executing various program instructions. The at least one processor may be included in a control system that includes a local controller, a remote computer, and/or a supervisory computer. Operation 82 includes obtaining ultrasonic pulse transmission and detection data from the first and second ultrasonic transducers for each of the measurement paths. Operation 84 includes determining a first fluid flow rate using the ultrasonic pulse transmission and detection data for each of the measurement paths. Operation 86 includes determining a second fluid flow rate using a subset of the ultrasonic pulse transmission and detection data that is used to determine the first fluid flow rate, wherein the subset of the ultrasonic pulse transmission and detection data includes only the ultrasonic pulse transmission and detection data for a subset of the measurement paths. Operation 88 includes determining whether a difference between the first fluid flow rate and the second fluid flow rate is greater than a difference setpoint. Other operations may described herein may also be included.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an electrically erasable programmable read-only memory (EEPROM), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A system, comprising:
   a plurality of ultrasonic transducer pairs arranged about a conduit to establish a plurality of measurement paths through the conduit, wherein each ultrasonic transducer pair includes first and second ultrasonic transducers positioned about the conduit to establish one of the plurality of measurement paths through the conduit, wherein each measurement path is directed at an acute angle relative to a central axis of the conduit;
   a control system for communication with the first and second ultrasonic transducers of each of the plurality of ultrasonic transducer pairs, wherein the control system is configured to perform operations comprising:
      obtaining ultrasonic pulse transmission and detection data from the first and second ultrasonic transducers for each measurement path included in a set of the measurement paths;
      determining a first fluid flow rate using the ultrasonic pulse transmission and detection data for each measurement path included in the set of the measurement paths;
      determining a second fluid flow rate using the ultrasonic pulse transmission and detection data for each measurement path included in a subset of the measurement paths, wherein the subset of the measurement paths includes fewer measurement paths than in the set of the measurement paths and includes only measurement paths included in the set of the measurement paths; and
      determining whether a difference between the first fluid flow rate and the second fluid flow rate is greater than a difference setpoint.

2. The system of claim 1, the operations further comprising:
   triggering an alarm in response to determining that the difference between the first fluid flow rate and the second fluid flow rate is greater than the difference setpoint.

3. The system of claim 1, wherein the measurement paths in the subset of measurement paths is predetermined.

4. The system of claim 1, wherein the operations further comprising:
   receiving user input selecting one or more of the measurement paths in the set of measurement paths to be included in the subset of the measurement paths.

5. The system of claim 1, wherein the difference between the first fluid flow rate and the second fluid flow rate is a percentage difference, and wherein the difference setpoint is a percentage difference setpoint.

6. The system of claim 1, wherein the first and second fluid flow rates are volumetric fluid flow rates.

7. The system of claim 1, wherein the first and second fluid flow rates are mean fluid flow velocities.

8. The system of claim 1, wherein the control system is a local controller disposed in a housing that is secured to the conduit.

9. The system of claim 1, wherein the control system is a remote computer that receives the transmission and detection data from the plurality of ultrasonic transducer pairs over a network.

10. The system of claim 1, wherein the control system includes a local controller disposed in a housing that is secured to the conduit and a remote computer for communication with the local controller over a network.

11. The system of claim 1, wherein the operation of determining the first fluid flow rate includes further operations comprising:
    determining, for each measurement path in the set of the measurement paths, a path velocity;
    determining, for each measurement path in the set of the measurement paths, a first weighted path velocity as a mathematical product of the path velocity for the measurement path and a first weighting factor that is assigned to the measurement path for use in determining the first fluid flow rate; and
    determining the first fluid flow rate as a sum of the first weighted path velocities for each measurement path in the set of the measurement paths, wherein the first fluid flow rate is a mean fluid flow velocity through the conduit.

12. The system of claim 11, wherein the subset of the measurement paths includes multiple measurement paths, and wherein the operation of determining the second fluid flow rate includes further operations comprising:
    determining, for each measurement path in the subset of the measurement paths, a second weighted path velocity as a mathematical product of the path velocity for the measurement path and a second weighting factor that is assigned to the measurement path for use in determining the second fluid flow rate; and
    determining the second fluid flow rate as a sum of the second weighted path velocities for each measurement path of the subset of the measurement paths, wherein the second fluid flow rate is a mean fluid flow velocity through the conduit.

13. The system of claim 11, wherein the subset of the measurement paths is a single measurement path, and wherein the operation of determining the second fluid flow rate includes further operations comprising:
    determining the second fluid flow rate as a mathematical product of the path velocity for the single measurement path and a second weighting factor that is assigned to the single measurement path, wherein the second fluid flow rate is a mean fluid flow velocity through the conduit.

14. The system of claim 1, wherein the operation of determining the first fluid flow rate includes further operations comprising:

determining, for each measurement path in the set of the measurement paths, a path velocity;

determining, for each measurement path in the set of the measurement paths, a first weighted path velocity as a mathematical product of the path velocity for the measurement path and a first weighting factor that is assigned to the measurement path for use in determining the first fluid flow rate;

determining a first mean fluid flow velocity through the conduit as a sum of the first weighted path velocities for each measurement path; and determining the first fluid flow rate as a mathematical product of the first mean fluid flow velocity and a cross-sectional area of the conduit.

15. The system of claim 14, wherein the subset of the measurement paths includes multiple measurement paths, and wherein the operation of determining the second fluid flow rate includes further operations comprising:

determining, for each measurement path in the subset of the measurement paths, a second weighted path velocity s a mathematical product of the path velocity for the measurement path and a second weighting factor that is assigned to the measurement path for use in determining the second fluid flow rate;

determining a second mean fluid flow velocity through the conduit as a sum of the second weighted path velocities for each of the measurement paths in the subset of the measurement paths; and determining the second fluid flow rate as a mathematical product of the second mean fluid flow velocity and the cross-sectional area of the conduit, wherein the second fluid flow rate is a volumetric fluid flow rate through the conduit.

16. The system of claim 14, wherein the subset of the measurement paths is a single measurement path, and wherein the operation of determining the second fluid flow rate includes further operations comprising:

determining a second mean fluid flow velocity as a mathematical product of the path velocity for the single measurement path and a second weighting factor that is assigned to the single measurement path for use in determining the second fluid flow rate; and determining the second fluid flow rate as a mathematical product of the second mean fluid flow velocity and the cross-sectional area of the conduit, wherein the second fluid flow rate is a volumetric fluid flow rate through the conduit.

17. The system of claim 1, wherein the ultrasonic pulse transmission and detection data for each measurement path includes a first transit time for an ultrasonic pulse transmitted along the measurement path with a direction of fluid flow through the conduit and a second transit time for an ultrasonic pulse transmitted along the measurement path against the direction of fluid flow through the conduit.

18. The system of claim 1, wherein the ultrasonic pulse transmission and detection data for each measurement path includes a path velocity.

19. The system of claim 1, wherein the ultrasonic pulse transmission and detection data for the first and second ultrasonic transducers of each ultrasonic transducer pair includes an ultrasonic pulse frequency shift.

20. The system of claim 1, wherein the measurement paths are selected from diametric paths, chordal paths, reflective paths, and combinations thereof.

21. The system of claim 1, the operations further comprising:

storing the first fluid flow rate in a data storage device; and flagging the first fluid flow rate as having reduced reliability in response to determining that the difference between the first fluid flow rate and the second fluid flow rate is greater than the difference setpoint.

22. A system, comprising:

a plurality of ultrasonic transducer pairs arranged about a conduit to establish a plurality of measurement paths through the conduit, wherein each ultrasonic transducer pair includes first and second ultrasonic transducers positioned about the conduit to establish one of the plurality of measurement paths through the conduit, wherein each measurement path is directed at an acute angle relative to a central axis of the conduit;

a non-volatile storage device storing program instructions; and a processor for communication with the first and second ultrasonic transducers of each of the plurality of ultrasonic transducer pairs and configured to process the program instructions, wherein the program instructions are configured to, when processed by the processor, cause the processor to perform operations comprising:

obtaining ultrasonic pulse transmission and detection data from the first and second ultrasonic transducers for each measurement path included in a set of the measurement paths;

determining a first fluid flow rate using the ultrasonic pulse transmission and detection data for each measurement path included in the set of the measurement paths;

determining a second fluid flow rate using the ultrasonic pulse transmission and detection data for each measurement path included in a subset of the measurement paths, wherein the subset of the measurement paths includes fewer measurement paths than in the set of the measurement paths and includes only measurement paths included in the set of the measurement paths; and determining whether a difference between the first fluid flow rate and the second fluid flow rate is greater than a difference setpoint.

* * * * *